Figure 1:
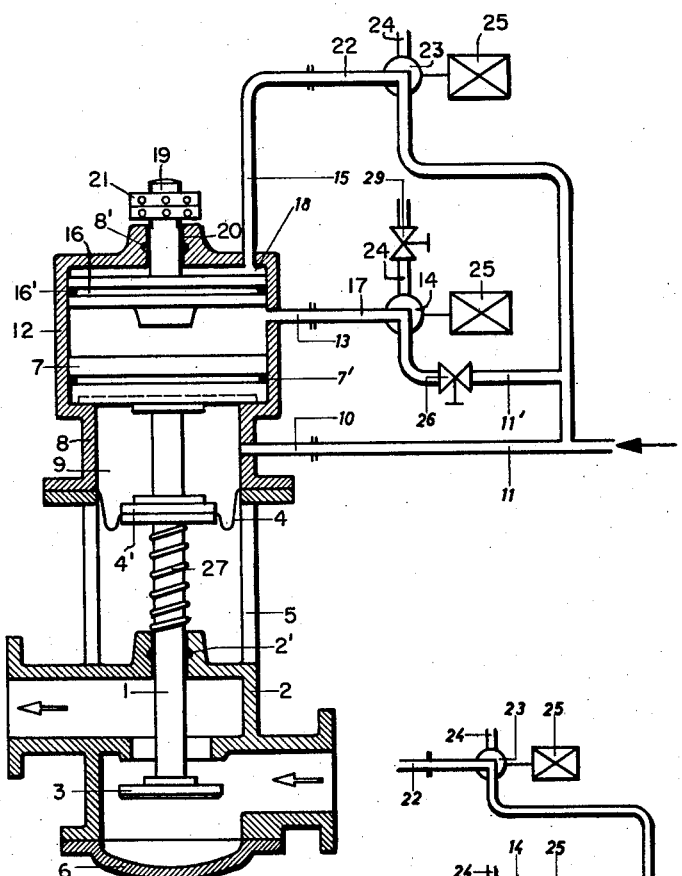

Nov. 3, 1964 W. HARTUNG ETAL 3,155,365
PRESSURE MEDIUM CONTROLLED LIQUID VALVE
FOR AUTOMATIC FLOW LIMITATION DEVICES
Filed Oct. 28, 1960

INVENTOR.
WALTER HARTUNG
AND WILLI DAUME
BY

ATT'YS

United States Patent Office 3,155,365
Patented Nov. 3, 1964

3,155,365
PRESSURE MEDIUM CONTROLLED LIQUID VALVE FOR AUTOMATIC FLOW LIMITATION DEVICES
Walter Hartung, Haus auf der Buchhalde, Donaueschingen, Germany, and Willi Daume, Hannover, Germany; said Daume assignor to said Hartung
Filed Oct. 28, 1960, Ser. No. 65,721
8 Claims. (Cl. 251—25)

This invention is concerned with a pressure-medium controlled liquid valve for automatic flow limitation devices. It is well known in the art for the filling of liquids to use a quantity pre-selection mechanism which comprises a flowmeter and which, for instance, for the filling of a tank truck or the like, is pre-set to a certain quantity of liquid, e.g., 5000 litres. A liquid valve is automatically closed by means of such a quantity pre-selection device as soon as the pre-selected quantity has passed through the flowmeter. Several technical difficulties arise during this operation. In order not to influence unfavorably the accuracy of the flow metering mechanism this must not be loaded by mechanical forces used for the control of the liquid valve. For this reason, liquid valves are used for such purposes, which can be controlled from the quantity pre-selection mechanism by means of an auxiliary energy, such as compressed air.

In order to be able to check with sufficient accuracy the quantity pre-selected, it is necessary to close the liqiud valve without lag when the pre-selected quantity is reached. This, however, in most cases causes difficulties since with any quick-action closing of the liquid valve considerable liquid impact occurs.

In order to avoid these difficulties, it is well known in the art to set the liquid valve to a throttling intermediate position in which only 10% of the original flow is allowed to pass through, for instance, after a certain quantity, say 4900 litres, has flowed through the valve, i.e., shortly before the whole quantity pre-set (5000 litres) is reached. With the now throttled liquid flow the quantity still missing is filled and a quick-action closing of the liquid valve effected when the whole quantity pre-set is reached. Since the quick-action closing of the valve now occurs at heavily throttled liquid flow, the liquid impact remains within tolerable limits.

Thus, liquid valves for such automatic flow limitation devices are well known, with which the valve member is opened against the action of a valve closing force by means of a valve lifting member impinged upon by a pressure medium, and with which, before closing, the valve is set to a throttling intermediate position by means of pressure relief of the valve lifting member in order to avoid any heavy liquid impact, the pressure relief action being operated by a pressure medium control device actuated by the quantity pre-selection device.

With the well-known liquid valves of this type, the intermediate position of the valve member is obtained in that the control pressure loading the valve lifting member is reduced by the opening of a discharge throttle. An equilibrium is then created between the valve closing force and the reduced control pressure when the valve member is in an intermediate position.

Such a control, however, has considerable disadvantages. Actually, it is necessary during the period of the intermediate valve position to maintain a reduced control pressure by means of throttling the discharge, so that there is a considerable consumption of pressure medium during this time. Since stuffing-box friction and the like are of some influence, the equilibrium between the reduced control pressure and the valve closing force does not guarantee a defined intermediate position. The valve member will reach the equilibrium only with a certain lag, which causes a prolongation of the filling time. In order to obtain a quick-action closing the valve, where the control pressure medium must be completely displaced from the pressure chamber of the valve lifting member, a very strong valve closing spring is necessary. For this purpose, however, high control pressure or large control pressure areas of the valve lifting member are necessary.

In contrast to the well-known liquid valve operating with reduced control pressure, the invention consists therein that an auxiliary lifting member impinged upon by the control pressure in a pressure chamber is connected with a stop on which the valve lifting member comes to rest in the intermediate position, and that the pressure chamber of the auxiliary lifting member can optionally be connected to the control pressure line or to the pressure medium discharge by means of a change-over device which is actuated by the quantity pre-selection device.

It is thereby achieved that the intermediate position of the valve lifting element and valve member is accurately determined and adjustable by the stop. The control pressure medium consumption is considerably lower since with each closing operation only the filling volume of the control pressure chambers is tapped and gets lost, while during the period of intermediate position no control pressure medium needs to be tapped.

The invention further provides that the valve lifting member has two pressure areas of different size between which a control pressure chamber is formed and in which latter chamber a valve closing force is built up. In this manner it is possible to effect the quick-action closing to the valve by means of the pressure medium or to assist this action, so that only a relatively weak valve closing spring is necessary and a safe closing of the valve is ensured even in the event of a spring breakage. Advantageously, the pressure control chamber, in which the valve closing force is built up, is connected with a discharge pipe during the opening action of the valve, this connection being established by means of a change-over device which is actuated by the quantity pre-selection device. Any opening action of the valve then can be effected with a relatively low control pressure or with small control pressure surfaces, respectively.

A simple and space saving constructional setup of the liquid valve results in a further development of the idea of the invention thereby that the auxiliary lifting member and the valve lifting member are arranged in a common cylinder, and that these two members limit two pressure chambers which can independently of each other optionally be connected to the control pressure line or to a pressure medium discharge by means of a change-over device which is actuated by the quantity pre-selection mechanism.

It is possible with such an arrangement to interconnect an adjustable throttling device in the discharge pipe of the pressure chamber, which is located between the auxiliary lifting member and the valve lifting member, so that the valve closing member can be moved into the intermediate position with an adjustable time lag and without thereby influencing the quick-action closing of the valve, since this throttling device remains ineffective during the quick-action closing. The opening action also can be influenced in an adjustable manner and, if necessary, for care of the flow measuring system and the valve, retarded. This is effected thereby that an adjustable throttling device is interconnected in the control pressure pipe leading to the control pressure chamber of the valve lifting member.

An embodiment of the invention is schematically illustrated in the accompanying drawings and more fully described in the following detailed description.

Figure 2:
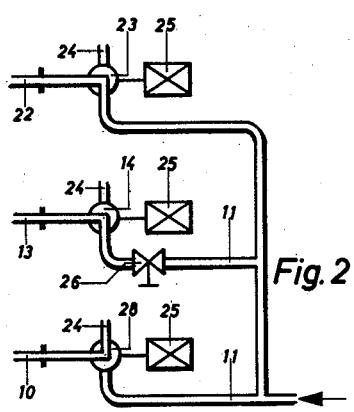

In the drawings:

FIG. 1 shows the liquid valve in sectional representation and with schematical indication of the pressure medium pipes, and FIG. 2 shows the pressure medium control in a somewhat modified form.

Numeral 1 designates the valve stem of a valve member 3 which is arranged in a valve housing 2 and connected with a diaphragm 4. The diaphragm 4 closes a shoulder 5 in the upper portion of the valve housing 2. A piston 7 the diameter of which is larger than that of the diaphragm 4 slides in a cylinder 12 and is connected with the diaphragm disc 4'. The cylinder 12 is located in a head piece 8 closed on top and which is mounted on the shoulder 5 of the valve housing 2. A control pressure chamber 9, which is connected to a pressure medium pipe 11 by means of a short pipe 10, is located between the diaphragm 4 and the piston 7. Another control pressure chamber 12 is located on the outside of the piston 7. A pipe 13 establishes a connection with the three-way cock 14. Another piston 16 sealed by means of cord-packing 16' is also arranged in the cylinder 6. Another control pressure chamber 18 is limited by this latter piston 16. A stop pin 19 is attached to the piston 16 and penetrates the head portion 8 in upward direction through a guide which is sealed by means of cord packing 8'.

An adjusting nut 21 to be actuated from the outside permits to adjust the lowermost position of the stop pin 19. The control pressure chamber 18 is connected to another three-way cock 23 via pipes 15 and 22.

The three-way cocks 14, 23 permit optionally to connect the respective control pressure chamber 12 or 18, respectively, to the pressure medium pipe 11 or to a discharge pipe 24. The operation of the three-way cocks 14, 23 is effected, for instance, by means of magnets 25. The magnets 25 are switched by a quantity pre-selection mechanism (not represented in the drawings). It is, of of course, possible also to have the three-way cocks 14, 23 changed over mechanically directly by a quantity pre-selection mechanism.

Adjustable throttle valves 26, 29 are inter-connected in the pressure medium feed pipe leading to the three-way cock 14 and also in the discharge pipe belonging thereto.

In the opened position of the valve shown in FIG. 1, all control pressure chambers 9, 12, 18 are connected to the pressure medium pipe. The control pressure existing in the chamber 9 tends to move the valve member 3 into the closing position and therefore acts in the same direction as the valve closing spring 27. However, the control pressure acting on the surface of the piston 7 in the chamber 12 maintains the valve member 3, while overcoming the closing forces, in the opened position. If now the three-way cock 14 is so changed over that the control pressure chamber 12 is connected with the discharge 24, i.e. no pressure exists in the control pressure chamber 12 then the valve member 3 is moved, under the influence of the closing forces, the closing direction until the piston 7 rests against the stop pin 19. The stop pin 19 is maintained in its rest position by the control pressure governing in the chamber 18. The valve member 3 has thus reached its intermediate position which is accurately defined by the adjustable stop pin 19. If now the three-way cock 23 is changed over, so that the control pressure existing in the chamber 18 disappears, the stop pin 19 gives way to the closing forces and the valve member 3 moves rapidly into the closing position.

For the opening of the valve, both three-way cocks 14, 23 are again changed over to the pressure medium pipe 11. The control pressure existing in the chamber 18 immediately forces the stop pin 19 again into its stop position, so that the valve member 3 moves in the desired manner and without lag into the intermediate position. Owing to the throttling at 26, the control pressure develops in the chamber 12 with adjustable retardation, so that the valve member 3 moves correspondingly slowly into the opened position. Liquid impact is thereby avoided and the normally connected flow metering devices are protected against undue strain.

The pressure in the control pressure chamber 9, which—owing to the varying pressure surfaces (4, 7)—generates a force component assisting the closing force of the spring 27, makes it possible to do with a relatively weak valve closing spring 27. The valve is securely closed by the closing force component even if a breakage of the valve closing spring should occur.

With larger type valves, however, the closing force component generated by the control pressure in the chamber 9 is of great advantage, because—as shown in FIG. 2—it is easily possible to make it ineffective during the opening action of the valve without the necessity of renouncing it during the closing action. For this purpose, another three-way cock 28 is arranged between the pressure medium pipe 11 and the pipe leading to the control pressure chamber 9. In the opened position of the valve, the control pressure chamber 9 is connected with the discharge 24 by means of this three-way cock 28, so that the chamber 9 is without pressure. Therefore, for the opening action of the valve, the control pressure in the chambers 12 and 18 only has to overcome the force of the valve closing spring 27, while, during the closing action, a control pressure component generated by the changeover of the three-way cock 28 to the pressure medium pipe 11 is available in addition to the force of the spring 27.

If now the pressure medium discharge is throttled by the throttling valve 29, then the valve member 3, after changing over the three-way cock 14, moves with an adjustable time lag into its intermediate position and which is advantageous for the care of the valve and the flowmeter. A non-retarded quick-action closing of the valve is achieved by changing over the three-way cock 23, in spite of this throttling of the discharge, since in this case, the piston 7 and 16 move jointly upwards, no pressure medium needing be displaced from the control pressure chamber 12 and therefore the discharge throttle 29 remaining ineffective.

What is here claimed is:

1. In a pressure-medium operated liquid valve comprising a valve housing having inlet and outlet ports and a valve seat therebetween, a valve member comprised of a valve stem and valve head mounted therein and arranged to engage said valve seat, a spring loading said valve member to the closed position, the improvement which comprises valve control means comprising a control housing affixed to said valve housing, said control housing defining a bore circular in cross section, valve actuating means including first piston means positioned in and sealingly engaging the wall of said bore and dividing said chamber into a control chamber and diaphragm chamber, diaphragm means closing the end of said diaphragm chamber, the diameter of said diaphragm means being smaller than the diameter of said piston means, said piston means and the center of said diaphragm means being connected in spaced-apart relationship and being connected to the valve member, auxiliary valve actuating means including an auxiliary piston means positioned in the control chamber and sealingly engaging the wall of said bore and forming a proximal chamber with said first piston means and a distal chamber with the end of said bore, limiting means connected to said auxiliary valve actuating means for limiting inward axial movement thereof to a position wherein said valve member is restrained in an intermediate position, first fluid transfer means having fluid supply and fluid discharge means connected to said proximal chamber for opening said valve member, second fluid transfer means having fluid supply and fluid discharge means connected to said distal chamber for moving said auxiliary valve actuating means to its inward axial limiting position, third fluid transfer means connected to said diaphragm chamber for providing a differential force augmenting the force of said valve spring, and control means connected to said first and said second fluid transfer means for optionally connecting each transfer means to said fluid supply or to said fluid discharge means.

2. A valve according to claim 1 wherein a control means is connected to said third fluid transfer means for optionally connecting said fluid transfer means to a fluid supply or to a fluid discharge means.

3. A valve according to claim 1 wherein an adjustable throttling means is connected in the fluid supply means of said first fluid transfer means for regulating the opening speed of said valve member.

4. A valve according to claim 1 wherein an adjustable throttling means is connected in the fluid discharge means of said first fluid transfer means for controlling the closing speed of said valve member.

5. A valve according to claim 1 wherein an adjustable throttling means is connected in each of the fluid supply and the fluid discharge means of said first fluid transfer means for controlling both the opening speed and the closing speed of said valve member.

6. A fluid motor for use with a fluid pressure source, a valve having a valve body, a valve actuating member biased toward valve closed position, said motor including: housing means attached to said body and having a opening therein, at least a part of said opening comprising a cylindrical bore; movable means dividing said opening into two chambers, movable with respect to said housing and connected to the actuating member, whereby when said member is moved in the valve opening direction the volume of one of said chambers expands and the other contracts and when the member is moved in the valve closing direction the volume of said other chamber expands and said one chamber contracts, said movable means including a piston in said bore and separating said two chambers, and movable sealing means affixed to said piston and spaced therefrom and defining said other chamber therebetween, the effective area of the sealing means being smaller than the effective area of the piston; a first fluid transfer device communicating with said one chamber and with said fluid pressure source and adjustable between a position at which said one chamber communicates with said fluid pressure source and a second position at which said one chamber is opened to exhaust to apply a first force to said movable means tending to move said member in the valve opening direction when in the first position and to relieve said force when in the second position, said device including a member by which it may be adjusted between said positions; a second fluid device connecting said other chamber to said fluid pressure source to apply a second force to the movable means tending to move the member in the valve closing direction; said movable means being constructed and arranged so that with each chamber connected to said fluid pressure source said first force is greater than said second force; and fluid operated movable stop means in said one chamber normally positioned out of the path of said movable means as the actuating member moves between the valve opened and the valve closed positions, and including means to move said stop means into said path to a position at which said actuating member is blocked from returning to the valve closed position as it moves away from the valve opened position, said stop means including a second piston between the closed end of the bore and the first piston, means to limit the movement of the second piston in the direction away from the closed end of the bore, a third fluid device communicating with the portion of the bore between the closed end thereof and the second piston, and means to connect said portion of the bore alternatively with said fluid pressure source and exhaust.

7. A fluid motor for use with a fluid pressure source, a valve having a valve body, a valve actuating member biased toward valve closed position, said motor including: housing means attached to said body and having an opening therein; movable means dividing said opening into two chambers, movable with respect to said housing and connected to the actuating member, whereby when said member is moved in the valve opening direction the volume of one of said chambers expands and the other contracts and when the member is moved in the valve closing direction the volume of said other chamber expands and said one chamber contracts; a first fluid transfer device communicating with said one chamber and with said fluid pressure source and adjustable between a position at which said one chamber communicates with said fluid pressure source and a second position at which said one chamber is opened to exhaust to apply a first force to said movable means tending to move said member in the valve opening direction when in the first position and to relieve said force when in the second position, said device including a member by which it may be adjusted between said positions; a second fluid device connecting said other chamber to said fluid pressure source to apply a second force to the movable means tending to move the member in the valve closing direction; said movable means being constructed and arranged so that with each chamber connected to said fluid pressure source said first force is greater than said second force; and fluid operated movable stop means in said one chamber normally positioned out of the path of said movable means as the actuating member moves between the valve opened and the valve closed positions, and including means to move said stop means into said path to a position at which said actuating member is blocked from returning to the valve closed position as it moves away from the valve opened position, said means to move said stop means including a linear fluid motor having a limited stroke and a three-way valve means communicating with the linear fluid motor, the fluid pressure source and exhaust to move the stop means to said blocking position when said source is in communication with said linear motor through said three-way valve, and to release said stop means when said linear motor is connected to exhaust.

8. A fluid motor for use with a fluid pressure source, a valve having a valve body, a valve actuating member biased toward valve closed position, said motor including: housing means attached to said body and having an opening therein, at least a part of said opening comprising a cylindrical bore; movable means dividing said opening into two chambers, movable with respect to said housing and connected to the actuating member, whereby when said member is moved in the valve opening direction the volume of one of said chambers expands and the other contracts and when the member is moved in the valve closing direction the volume of said other chamber expands and said one chamber contracts, said movable means including a piston in said bore and separating said two chambers, and movable sealing means affixed to said piston and spaced therefrom and defining said other chamber therebetween, the effective area of the sealing means being smaller than the effective area of the piston; a first fluid transfer device communicating with said one chamber and with said fluid pressure source and adjustable between a position at which said one chamber communicates with said fluid pressure source and a second position at which said one chamber is opened to exhaust to apply a first force to said movable means tending to move said member in the valve opening direction when in the first position and to relieve said force when in the second position, said device including a member by which it may be adjusted between said positions; a second fluid device connecting said other chamber to said fluid pressure source to apply a second force to the movable means tending to move the member in the valve closing direction; said movable means being constructed and arranged so that with each chamber connected to said fluid pressure source said first force is greater than said second force; and fluid operated movable stop mean normally positioned out of the path of said movable means as the actuating member moves between the valve opened and the valve closed positions, and including means to move said stop means into said path to a position at which said actuating member is blocked from returning to the valve closed position as it moves away from the valve opened position.

References Cited by the Examiner

UNITED STATES PATENTS

| | | | |
|---|---|---|---|
| 151,423 | 5/74 | Osborn | 251—31 |
| 640,615 | 1/00 | Borden | 251—31 |
| 1,566,814 | 12/25 | Bliss | 251—60 X |
| 1,829,807 | 11/31 | McMurrin | 121—48 X |
| 1,926,076 | 9/33 | Whalen | 251—62 X |
| 2,230,914 | 2/41 | Sherman | 251—61 |
| 2,360,321 | 10/44 | Griswold | 137—624.18 X |
| 2,600,493 | 6/52 | Farris | 251—31 |
| 2,604,878 | 7/52 | Stevens | 121—38 |
| 2,626,633 | 1/53 | Wilson | 251—73 XR |
| 2,888,233 | 5/59 | Windsor | 251—30 |

M. CARY NELSON, *Primary Examiner.*

ISADOR WEIL, WILLIAM F. O'DEA, M. KAUFMAN, LAVERNE D. GEIGER, *Examiners.*